(12) United States Patent
Hara

(10) Patent No.: US 7,055,590 B2
(45) Date of Patent: Jun. 6, 2006

(54) AIR CONDITIONING APPARATUS FOR VEHICLE

(75) Inventor: Junichiro Hara, Ashikaga (JP)

(73) Assignee: Calsonic Kansei Corporation, Tokyo (JP)

(*) Notice: Subject to any disclaimer, the term of this patent is extended or adjusted under 35 U.S.C. 154(b) by 218 days.

(21) Appl. No.: 10/756,755

(22) Filed: Jan. 14, 2004

(65) Prior Publication Data

US 2004/0200610 A1    Oct. 14, 2004

(30) Foreign Application Priority Data

Jan. 15, 2003    (JP)    ............................. 2003-007350

(51) Int. Cl.
*F25B 29/00*    (2006.01)
*F25B 1/00*    (2006.01)
*B60H 1/00*    (2006.01)
*B60H 3/00*    (2006.01)

(52) U.S. Cl. .................... 165/202; 165/42; 165/43; 165/240; 62/197; 62/238.6; 62/113; 62/114; 62/513; 62/196.4; 62/323.1; 237/2 B; 237/12.3 B

(58) Field of Classification Search ................ 165/202, 165/42, 43, 240; 62/197, 238.6, 113, 114, 62/513, 196.4, 323.1; 237/12.3 B, 2 B
See application file for complete search history.

(56) References Cited

U.S. PATENT DOCUMENTS 2,038,193 A * 4/1936 Parsons ................. 237/12.3 B
3,196,630 A * 7/1965 Barbier .................... 62/197
3,421,339 A * 1/1969 Volk et al. ................. 62/159

(Continued)

FOREIGN PATENT DOCUMENTS

| DE | 198 06 654 A1 | 8/1999 |
| DE | 198 18 649 A1 | 10/1999 |
| GB | 2 374 138 A | 10/2002 |

(Continued)

OTHER PUBLICATIONS

English Translation of German Patent Application DE 198 18 649 A1 (Oct. 28 1999).

(Continued)

*Primary Examiner*—John K. Ford
(74) *Attorney, Agent, or Firm*—Foley & Lardner LLP

(57) ABSTRACT

An air conditioning apparatus includes a valve for selectively introducing the coolant discharged from a compressor to either a flow path for a water-coolant heat exchanger or another flow path to avoid the heat exchanger, a thermostat for detecting the temperature of a cooling water flowing into an engine and a controller for controlling the valve. When the temperature of the cooling water is equal to or less than a predetermined temperature, the controller controls the valve so that the coolant discharged from the compressor is introduced to the water-coolant heat exchanger. When the temperature of the cooling water is more than the predetermined temperature, the controller controls the valve so that the coolant discharged from the compressor avoids the water-coolant heat exchanger.

5 Claims, 3 Drawing Sheets

U.S. PATENT DOCUMENTS

| | | | | |
|---|---|---|---|---|
| 3,872,682 | A * | 3/1975 | Shook | 62/114 |
| 6,047,770 | A * | 4/2000 | Suzuki et al. | 165/202 |
| 6,543,531 | B1 * | 4/2003 | Casar et al. | 165/202 |
| 6,810,952 | B1 * | 11/2004 | Fredj et al. | 165/202 |
| 6,913,067 | B1 * | 7/2005 | Hesse | 165/43 |
| 2001/0013409 | A1 * | 8/2001 | Burk et al. | 165/42 |
| 2001/0052238 | A1 | 12/2001 | Burk et al. | |
| 2003/0010488 | A1 | 1/2003 | Watanabe et al. | |
| 2005/0022983 | A1 * | 2/2005 | Kadle et al. | 165/202 |
| 2005/0103487 | A1 * | 5/2005 | Aflekt et al. | 165/202 |

FOREIGN PATENT DOCUMENTS

| | | |
|---|---|---|
| JP | 2002-22299 A | 1/2002 |
| JP | 2003-97857 A | 4/2003 |

OTHER PUBLICATIONS

Office Action from European Patent Office in connection with EP 04 000 529.0 and citing German Patent Application DE 198 18 649 A1 (May 17, 2005).

* cited by examiner

FIG. 2

| OPE. MODE | VALVE 17 | VALVE 23 | VALVE 19 | VALVE 21 |
|---|---|---|---|---|
| INITIAL (HEATING) | SOLID LINE | CLOSE | SOLID LINE | — |
| NORMAL (HEATING) | SOLID LINE | CLOSE | BROKEN LINE | OPEN |
| INITIAL (COOLING) | SOLID LINE | OPEN | BROKEN LINE | CLOSE |
| NORMAL (COOLING) | BROKEN LINE | OPEN | BROKEN LINE | CLOSE |

AIR CONDITIONING APPARATUS FOR VEHICLE

BACKGROUND OF THE INVENTION

The present invention relates to an air conditioning apparatus for a vehicle.

It is generally known that the air conditioning apparatus at cooling operates to radiate heat from coolant compressed by a compressor to the outside through an outdoor heat exchanger for coolant. However, when a vehicle is at a stop where the velocity of cooling wind is remarkably small for the outdoor heat exchanger, the radiation efficiency is deteriorated remarkably.

Therefore, we previously proposed a coolant cycle by which sufficient cooling performance could be effected even if the outdoor heat exchanger is deteriorated in its radiation efficiency (Japanese patent application serial No. 2001-212274). According to the coolant cycle, a water-coolant heat exchanger for exchanging heat of the coolant of high temperature and-high pressure for engine cooling water is arranged between the compressor and the outdoor heat exchanger in order to bring about the similar effect as the outdoor heat exchanger being improved in radiation efficiency. Consequently, even if the radiation efficiency in a radiator is small, it is possible to assure the cooling performance of an evaporator.

Here noted when an engine starts, the temperature of lubricating oil inside the engine is relatively low together with the temperature of the engine. Then, friction of sliding parts of the engine is increased to reduce the efficiency of the engine. In the above coolant cycle, nevertheless, since the heating of cooling water by the coolant of high temperature allows the friction to be reduced in an early stage, the warm-up time for the engine can be shortened to improve its fuel consumption. Correspondingly, since the water temperature is also elevated in an early stage, the instantaneous effect at heating period can be improved.

In an air conditioning apparatus employing the above coolant cycle, however, the heat exchange between the coolant and the engine cooling water is always carried out in the water-coolant heat exchanger. If the water temperature of the engine cooling water is remarkably high, there arises a possibility that the water temperature is further elevated as a result of heat-exchanging at the water-coolant heat exchanger, so that the sliding parts of the engine may be damaged (e.g. burn-in) because of insufficient cool-down of the engine.

SUMMARY OF THE INVENTION

In such a situation, it is an object of the present invention to prevent an occurrence of defects due to insufficient cool-down of a power source for driving a vehicle in an air conditioning apparatus for vehicle where a water-coolant heat exchanger for exchanging heat of the coolant of high temperature and high pressure for engine cooling water is arranged between a compressor and an outdoor heat exchanger.

According to the present invention, the above-mentioned object is accomplished by an air conditioning apparatus for a vehicle, comprising: a coolant cycle including a compressor for compressing a coolant, an outdoor-side coolant heat exchanger for exchanging heat of the coolant compressed by the compressor with ambient air, an expansion unit for expanding the coolant after heat exchange at the outdoor-side coolant heat exchanger and an indoor-side coolant heat exchanger for exchanging heat of the coolant expanded by the expansion unit with air conditioning wind supplied into a vehicle cabin, a piping connecting the compressor, the coolant heat exchangers, and the expansion unit in communication with each other; a water-coolant heat exchanger arranged between the compressor and the outdoor-side coolant heat exchanger to exchange heat of the coolant discharged from the compressor with cooling water of a power source for driving the vehicle; a flow-path switching unit for selectively introducing the coolant discharged from the compressor to either a flow path for the water-coolant heat exchanger or another flow path to avoid the water-coolant heat exchanger; a detection unit for detecting a temperature of the cooling water flowing into the power source; and a control unit for controlling the flow-path switching unit in a manner that the coolant discharged from the compressor is introduced to the water-coolant heat exchanger when the temperature of the cooling water is equal to or less than a predetermined temperature and that the coolant discharged from the compressor avoids the water-coolant heat exchanger when the temperature of the cooling water is more than the predetermined temperature.

With the above-mentioned constitution of the air conditioning apparatus, when the cooling water for the power source is more than the predetermined temperature, the cooling water is not introduced into the water-coolant heat exchanger. Therefore, as the temperature of the cooling water is not elevated, it is possible to prevent an occurrence of damage due to seizure of sliding parts about the power source for driving the vehicle.

In a preferred embodiment, the air conditioning apparatus further comprises: a first expansion switching unit for selectively introducing the coolant supplied into the outdoor-side coolant heat exchanger to either a flow path for the expansion unit or another flow path to avoid the expansion unit; a heating expansion unit arranged between the water-coolant heat exchanger and the outdoor-side coolant heat exchanger to expand the coolant supplied to the outdoor-side coolant heat exchanger; and a second expansion switching unit for selectively introducing the coolant supplied into the outdoor-side coolant heat exchanger to either a flow path for the heating expansion unit or another flow path to avoid the heating expansion unit.

In this configuration, by controlling the first expansion switching unit and the second expansion switching unit so that the coolant expands at the heat expansion unit, it is possible, at heating, to improve the heating performance of the air conditioning apparatus due to increased endothermic amount from the outdoor-side coolant heat exchanger.

The air conditioning apparatus may further comprise a heat-exchanger switching unit for selectively introducing the coolant after heat exchange at the outdoor-side heat exchanger to either a flow path for the indoor-side coolant heat exchanger or another flow path to avoid the indoor-side coolant heat exchanger.

In this configuration, by controlling the heat-exchanger switching unit so that the coolant avoids the outdoor-side coolant heat exchanger at the initial stage of heating, it is possible to improve the apparatus' quickness in heating since the air conditioning wind supplied to the vehicle cabin is not cooled down.

The air conditioning apparatus may further comprise: an internal heat exchanger that performs heat exchange between the coolant discharged from the outdoor-side coolant heat exchanger and the coolant flowing into the compressor.

In this configuration, since the internal heat exchanger performs heat exchange between the coolant of high pressure and the coolant of low pressure, the temperature of the coolant of high-pressure is lowered at cooling. Therefore, it is possible to improve the efficiency of the coolant cycle.

In the air conditioning apparatus, the power source for driving the vehicle may comprise an engine.

These and other objects and features of the present invention will become more fully apparent from the following description and appended claims taken in conjunction with the accompany drawings.

BRIEF DESCRIPTION OF THE DRAWINGS

FIG. 2 is a diagram showing the opening/closing condition of a valve in respective operational modes of the air conditioning apparatus of FIG. 1.

DETAILED DESCRIPTION OF THE PREFERRED EMBODIMENT

Figure 1:
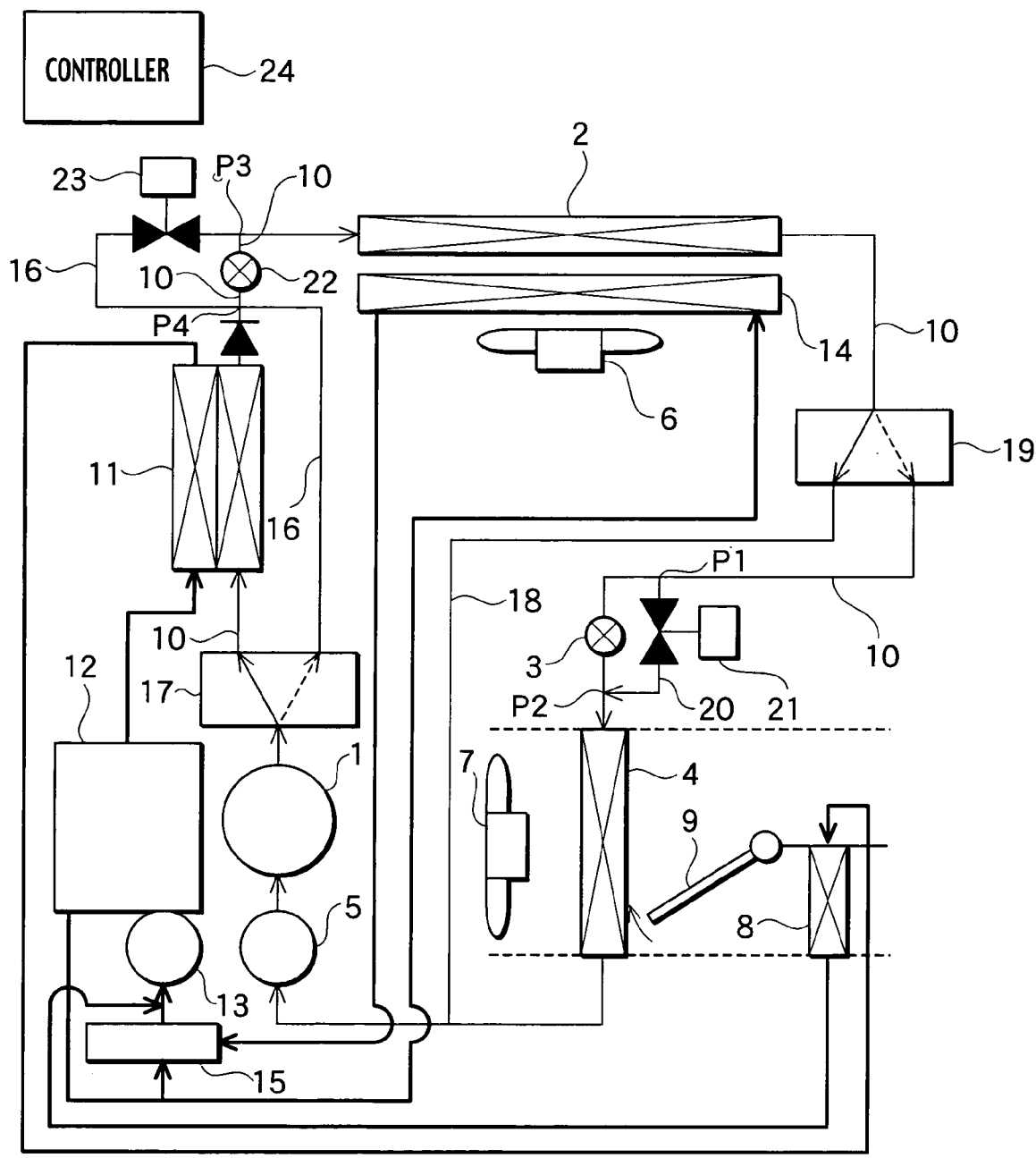
FIG. 1 is a schematic structural view of an air conditioning apparatus for a vehicle, in accordance with the first embodiment of the present invention.

Embodiments of the present invention will be described with reference to the accompanying drawings. FIG. 1 is a schematic structural view of an air conditioning apparatus for a vehicle, in accordance with the first embodiment of the present invention.

The air conditioning apparatus includes a compressor 1 for compressing coolant, a gas cooler 2 (as the outdoor-side coolant heat exchanger) that exchanges heat of coolant compressed by the compressor 1 for ambient air, a pressure control valve 3 (as the expansion unit) for adiabatically expanding the coolant after heat exchange at the gas cooler 2, an evaporator 4 (as the indoor-side coolant heat exchanger) that exchanges heat of the coolant expanded at the pressure control valve 3 for air conditioning wind supplied into a vehicle cabin and an accumulator 5 for separating the coolant flowing out of the evaporator 4 into vapor-phase coolant and liquid-phase coolant. Through the intermediary of a coolant piping, these constituents (1, 2, 3, 4 and 5) are connected in communication with each other in this order, providing a coolant cycle.

These constituents will be described in detail, below.

Due to a driving force from an engine or a motor, the compressor 1 compresses a coolant carbon-dioxide in gas-phase state and discharges the coolant of high temperature and high pressure to the gas cooler 2. In this embodiment, without being limited to one specified compressor, various kinds of compressors may be employed as the compressor 1, for example, variable-displacement type compressor that controls both discharge rate and pressure of the coolant on the basis of the coolant state in the coolant cycle internally, variable-displacement type compressor that controls both discharge rate and pressure of the coolant on the detection of the coolant state in the coolant cycle externally, compressor having a function to control its rotating speed with constant discharge rate and pressure, etc.

The gas cooler 2 serves to cool the coolant carbon-dioxide of high temperature and pressure compressed by the compressor 1 in heat-exchange for the ambient air etc. In order to promote the heat-exchanging action or ensure this action even when a vehicle is at a standstill, the gas cooler 2 is equipped with a cooling fan 6. For example, the gas cooler 2 is arranged on the front side of the vehicle to allow the internal coolant carbon-dioxide to radiate heat to an outdoor air temperature as possible.

The pressure control valve 3 operates to reduce the pressure of the coolant carbon-dioxide of high pressure since it passes through a decompression hole. Not only decompressing the coolant carbon-dioxide, the pressure control valve 3 has a function to control a pressure of the gas cooler 2 on its exit side, so that the coolant carbon-dioxide decompressed by the valve 3 flows into the evaporator 4 in the form of gas-liquid phases. Unlimitedly in the embodiment, for example, there is a decompression valve (e.g. valve disclosed in Japanese Patent Application Laid-open No. 2000-206780) that controls an opening-closing duty ratio of the decompression hole through electrical signals as the pressure control valve 3.

The evaporator 4 serves to cool air to be blown into the vehicle cabin and is installed in a casing of an in-vehicle air conditioning unit. Indoor air or outdoor air taken in by a fan 7 is cooled down since it passes through the evaporator 4. Successively, the so-cooled indoor or outdoor air is blown out through a not-shown nozzle toward a desired area in the vehicle cabin. That is, the coolant carbon-dioxide in gas-liquid phases flowing out through the pressure control valve 3 is cooled down when the coolant evaporates in the evaporator 4 while taking up latent heat of intake air.

On the downstream side of the evaporator 4 in the air conditioning unit, there is a heater core 8 (as the indoor-side cooling-water heat exchanger) where the engine cooling water circulates through a pipe. An air-mix door 9 is rotatably arranged in front of the heater core 8. When heating the intake air, the air-mix door 9 is rotated in a direction of arrow. When unheating the intake air, the air-mix door 9 is rotated in the opposite direction.

Separating the coolant carbon-dioxide passing through the evaporator 4 into a coolant in gas-phase state and a coolant in liquid-phase state, the accumulator 5 feeds only the coolant in gas-phase state to the compressor 1 and also stores the coolant in liquid-phase state temporarily.

Between the compressor 1 and the evaporator 4, a flow path 10 for leading the coolant discharged from the compressor 1 to the pressure control valve 3 through the gas cooler 2 is formed by a coolant pipe. In the flow path 10, a water-coolant heat exchanger 11 is interposed between the compressor 1 and the gas cooler 2 to heat-exchange the coolant compressed by the compressor 1 for the engine cooling water.

The engine cooling water circulates in the water-coolant heat exchanger 11 through a piping. That is, through the piping, there are successively connected an engine 12, the water-coolant heat exchanger 11, the heater core 8 and a water pump 13 in this order, forming the circulation cycle for the engine cooling water.

Different from the above arrangement, there is further provided a system to supply a radiator 14 with the engine cooling water. Thus, through a pipe, there are successively connected the engine 12, the radiator 14, a thermostat 15 and the water pump 13 in this order, allowing the engine cooling water to be returned to the engine 12 after being cooled down to an appropriate temperature for cooling the engine 12. The thermostat 15 (as the detection unit) has a function to detect the temperature of cooling water flowing into the engine 12.

Between the compressor 1 and the gas cooler 2, a flow path 16 is arranged to lead the coolant discharged from the compressor 1 to the gas cooler 2 while allowing the coolant to avoid the water-coolant heat exchanger 11. At a diverging point between the flow path 16 and the flow path 10, a valve 17 (as the flow-path switching unit) is arranged to introduce the coolant into either the path 16 or the path 10 selectively.

Between the gas cooler 2 and accumulator 5, a flow path 18, is arranged to lead the coolant from the gas cooler 2 to the accumulator 5 while allowing the coolant to avoid the evaporator 4. At a diverging point between the flow path 18 and the flow path 10, a valve 19 (as the heat-exchanger switching unit) is arranged to introduce the coolant into either the path 18 or the path 10 selectively.

Between the valve 19 and the evaporator 4, a branch path 20 is arranged to communicate a point P1 in the flow path 10 on the upstream side of the pressure control valve 3 with a point P2 on the downstream side of the valve 3. Further, a valve 21 as a first expansion switching unit is interposed in the branch path 20. When closing the valve 21, the coolant supplied into the evaporator 4 passes through the pressure control valve 3. While, when opening the valve 21, the coolant avoids the pressure control valve 3.

The flow path 10 is provided, between the water-coolant heat exchanger 11 and the gas cooler 2, with a pressure control valve 22 (as the heating expansion unit) that allows adiabatic expansion of the coolant supplied to the gas cooler 2. The pressure control valve 22 has the similar structure as that of the pressure control valve 3.

The flow path 16 is provided, between its intersections P3 and P4 both intersecting with the flow path 10, with a valve 23 (as the heating expansion switching unit). The coolant supplied to the gas cooler 2 passes through the pressure control valve 22 when closing the valve 23. While, when opening the valve 23, the coolant avoids the pressure control valve 22.

Noted that reference numeral 24 denotes a control unit (controller) which is constructed by a microcomputer and takes charge of control of the whole air conditioning apparatus on the basis of the program stored in ROM. At the initial stage of air-conditioning and also the normal stage, the controller 24 controls the valves 17, 19, 21 and 23 in their opening and closing, as shown in FIG. 2.

Only when the temperature detected by the thermostat 15 is less than a predetermined value (temperature), the controller 24 controls the valve 17 so that the coolant discharged from the compressor 1 is led to the water-coolant heat exchanger 11. The above predetermined value is established to be a temperature that if a temperature of the cooling water exceeds the above value, then insufficient cooling of the engine might cause any defect, such as burn-in of sliding parts.

In the above-constructed air conditioning apparatus for vehicle, since the coolant of high temperature and pressure discharged from the compressor 1 at heating radiates heat to the engine cooling water through the water-coolant heat exchanger 11 and is decompressed by the pressure control valve 22, it is possible for the gas cooler 2 to absorb great quantity of heat, whereby the heating can be performed with high efficiency.

Further, since the coolant pressurized by the compressor 1 heats the engine cooling water, the temperature of the engine cooling water is elevated. At a vehicle's starting in winter, generally, the temperature of the engine cooling water is so low as to be a temperature of the ambient air. It requires to beat the engine cooling water up to approx. 85° C., causing the fuel oil consumption to be increased more than usual. Nevertheless, according to the air conditioning apparatus of the embodiment, since the engine cooling water is heated by heat absorbed from the ambient air and heat of power supplied to the compressor 1, the engine cooling water is elevated in temperature earlier than usual, whereby it is possible to shorten a period to increase the fuel oil consumption of the engine.

If the engine is low in temperature, the temperature of lubricating oil inside the engine is low, so that the friction of the engine sliding parts gets large to reduce the efficiency of the engine. However, according to the embodiment, the friction can be reduced in an early stage since the engine cooling water is heated.

Additionally, since the temperature of the engine cooling water is elevated quickly, the heating capability of the heater core 8 is improved to allow quick heating of the vehicle cabin. Thus, it is possible to improve the amenity in the vehicle cabin and the fuel consumption.

At the initial stage of heating, since the coolant avoids the evaporator 4, the air conditioning wind supplied into the vehicle cabin is not cooled down, so that the temperature in the vehicle cabin rises quickly. Then, the coolant avoiding the evaporator 4 is separated into the liquid coolant and the gas coolant at the accumulator 5. Mainly, the gas coolant is sucked in the compressor 1.

At the normal stage of heating, the coolant absorbing heat at the gas cooler 2 is supplied to the evaporator 4 without passing through the pressure control valve 3. Then, the coolant absorbing heat at the evaporator 4 is separated into the liquid coolant and the gas coolant at the accumulator. Mainly, the gas coolant is sucked in the compressor 1. This operation mode is so-called "dehumidifying/heating mode" where the air conditioning wind is dehumidified since the coolant absorbs heat from the air conditioning wind supplied into the vehicle cabin. Further, it is also possible to differentiate the temperature about a passenger between upper and lower sides thereof by allowing the air conditioning wind to be cooled down at the evaporator 4 (e.g. passengers' head cool and passengers' feet warm).

At the initial stage of cooling, the coolant compressed by the compressor 1 radiates heat to the engine cooling water at the water-coolant heat exchanger 11 and also radiates heat at the gas cooler 2 after avoiding the pressure control valve 22. Thereafter, the coolant is decompressed by the pressure control valve 3 and successively flows into the evaporator 4. In this way, since the coolant cycle is established so that the coolant on the high-pressure side radiates heat at the water-coolant heat exchanger 11, the endothermic amount at the evaporator 4 is increased. Accordingly, it becomes possible to lower the temperature of the air conditioning wind furthermore, allowing rapid cooling of the interior of the vehicle cabin. Then, the coolant absorbing heat at the evaporator 4 is separated into the liquid coolant and the gas coolant and mainly, the gas coolant is sucked into the compressor 1.

At the normal stage of cooling, the coolant compressed by the compressor 1 flows into the gas cooler 2 while avoiding the water-coolant heat exchanger 11 and the pressure control valve 22. The subsequent flow of the coolant is similar to that at the initial stage of cooling.

For instance, the judgment whether the air conditioning apparatus is at the initial stage or the normal stage is carried out by judging whether a difference between the room temperature and a preset temperature is less than a predetermined value or not. Regarding the other judgments, there may be a method of judging whether the room temperature is within a predetermined range or not, a method of judging the temperature of the cooling water is more than a predetermined value, etc. Noted that the above-mentioned operation modes are not always fixed only at the initial or normal stages at heating and cooling and therefore, it is possible to select an appropriate operation mode corresponding to an actual situation in the vehicle cabin. For instance, if the discharge temperature of the coolant on the high-pressure side is more than a predetermined value at cooling, the apparatus may be controlled in the operation mode for the initial stage in spite of judgment of the normal stage, in order to cool the coolant. Alternatively, it may be performed that if automatically detecting a windshield getting fogged in spite of judgment of the initial stage at heating or if a passenger sets up the defrosting mode, the apparatus is controlled in the operation mode for the normal stage in order to dehumidify the vehicle cabin.

According to the embodiment, in any circumstances, when the temperature of the engine cooling water is more than the predetermined value, the position of the valve 17 is switched so as to allow the coolant discharged from the compressor 1 to avoid the water-coolant heat exchanger 11. Then, with no elevation of the engine cooling water in temperature, it is possible to prevent an occurrence of problems, such as seizure of sliding parts in an engine.

Since the air conditioning apparatus of the embodiment is constructed so as to heat the engine cooling water, there can be obtained the following effects.

First, it is possible to realize high heating performance for the apparatus without making alterations to an existing indoor-side air conditioning unit. While, if requiring to improve the heating performance by directly heating air, then it is necessary to provide the apparatus with a sub-condenser or sub-cooler. However, it is noted that the air conditioning apparatus of this embodiment dispenses with such a sub-unit.

Secondly, since the temperature of the engine cooling water is high, in case of using the air conditioning apparatus as a heat pump to pump up heat from the ambient air, it is possible to make the apparatus function as one heater to defrost the heat exchanger.

Figure 3:
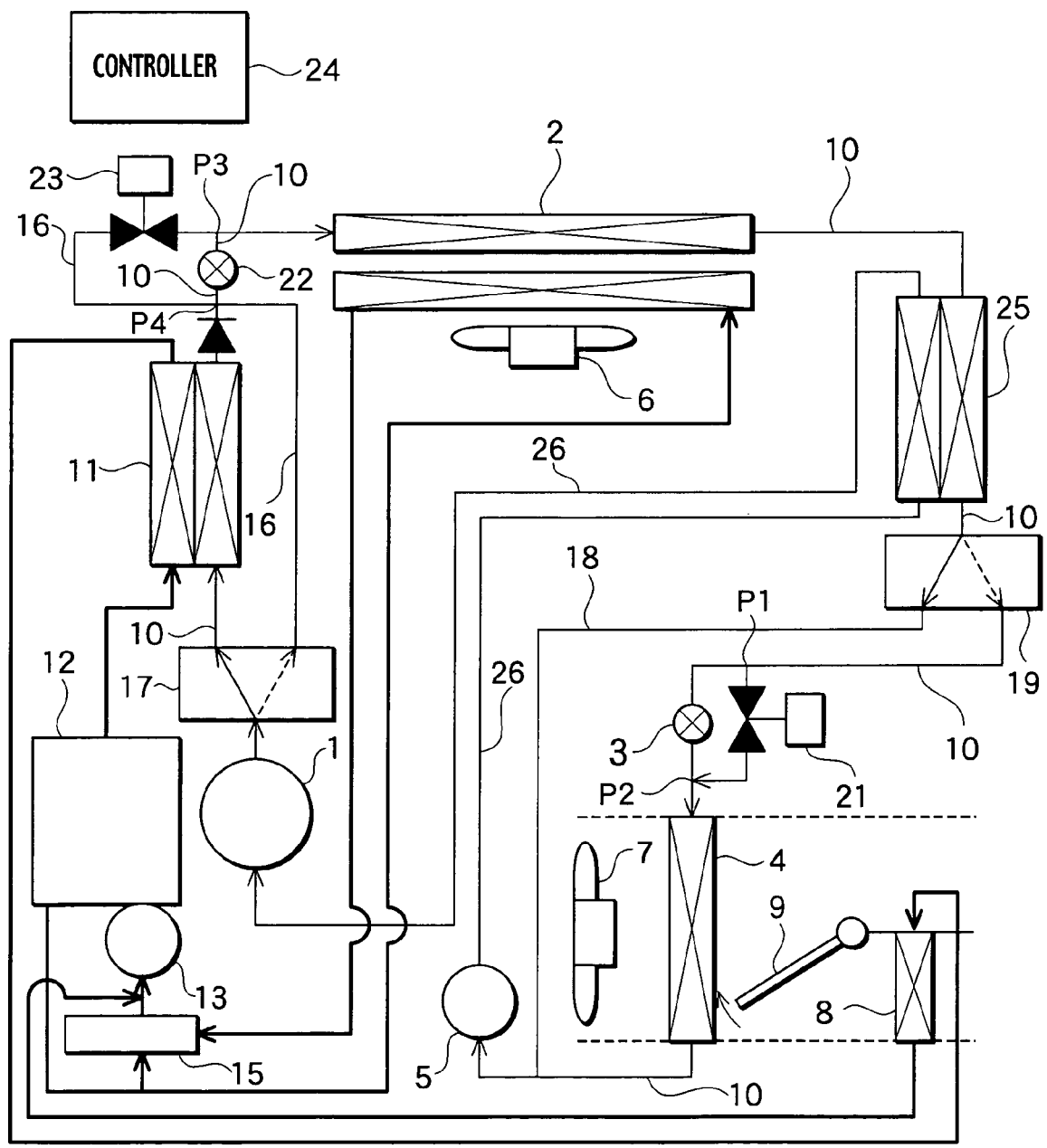
FIG. 3 is a schematic structural view of an air conditioning apparatus for a vehicle, in accordance with the second embodiment of the present invention.

Next, the second embodiment of the present invention will be described. FIG. 3 is a schematic structural view of the air conditioning apparatus in accordance with the second embodiment of the invention.

Note, in this embodiment, elements similar to those in the first embodiment are indicated with the same reference numerals respectively and therefore, their overlapping descriptions are eliminated.

According to the second embodiment, the air conditioning apparatus is provided with an internal heat exchanger 25 that performs heat exchange between the coolant discharged from the gas cooler 2 and the coolant flowing into the compressor 1. The internal heat exchanger 25 is arranged in the flow path 10, between the gas cooler 2 and the valve 19. In operation, through a flow path 26, the coolant flowing out of the accumulator 5 flows into the internal heat exchanger 25 in heat exchange for the coolant discharged from the gas cooler 2 and thereafter, the coolant flows into the compressor 1 through a flow path 26.

Owing to the heat exchange between the coolant on the high-pressure side and the coolant on the low-pressure side, the endothermic amount of the evaporator 4 at cooling is increased to improve the cooling efficiency. Noted that, at heating, both coolants flowing into the internal heat exchanger 25 are coolants on the low-pressure side together and therefore, the heat exchange between the coolants gets smaller remarkably. Thus, at heating, since the temperature of the coolant on the high-pressure side does not drop, there is no possibility that the heating performance of the apparatus is deteriorated.

In common with the above-mentioned embodiments, although the water-coolant heat exchanger is constructed so as to perform heat exchange between the coolant discharged from the compressor and the engine cooling water, the heat exchanger may be adapted so as to perform heat exchange of the coolant for a cooling water for any "vehicle driving" power source besides an engine, for example, stack of fuel cell.

Noted that if the power source for vehicle is such a stack of fuel cell, then the temperature of the stack of fuel cell can be elevated quickly since the cooling water is heated. In detail, it becomes possible for the stack of fuel cell to reach a temperature zone where a catalyst in the fuel cell is activated, allowing a vehicle to be brought into its travelable condition in early.

Finally, it will be understood by those skilled in the art that the foregoing descriptions are nothing but two embodiments of the disclosed air conditioning apparatus for vehicle. Besides these embodiments, various changes and modifications may be made to the present invention without departing from the scope of the invention.

This application claims priority from Japanese Patent Application 2003-007350, filed Jan. 15, 2003, which is incorporated herein by reference in its entirety.

What is claimed is:

1. An air conditioning apparatus for a vehicle, comprising:
   a coolant cycle including, in order, a compressor for compressing a coolant, an outdoor-side coolant heat exchanger for exchanging heat of the coolant compressed by the compressor with ambient air, an expansion unit for expanding the coolant after heat exchange at the outdoor-side coolant heat exchanger, an indoor-side coolant heat exchanger for exchanging heat of the coolant expanded by the expansion unit with air conditioning wind supplied into a vehicle cabin, and a piping that returns the cycle to the compressor, wherein the coolant heat exchangers and the expansion unit are in communication with each other;
   a water-coolant heat exchanger arranged between the compressor and the outdoor-side coolant heat exchanger to exchange heat of the coolant discharged from the compressor with cooling water of a power source for driving the vehicle;
   a flow-path switching unit for selectively introducing the coolant discharged from the compressor to either a flow path for the water-coolant heat exchanger or another flow path to avoid the water-coolant heat exchanger;
   a detection unit for detecting a temperature of the cooling water flowing into the power source;
   a control unit for controlling the flow-path switching unit such that the coolant discharged from the compressor either is introduced to the water-coolant heat exchanger when the temperature of the cooling water is equal to or less than a predetermined temperature or avoids the water-coolant heat exchanger when the temperature of the cooling water is more than the predetermined temperature;
   a heating expansion unit arranged between the water-coolant heat exchanger and the outdoor-side coolant heat exchanger to expand the coolant supplied to the outdoor-side coolant heat exchanger; and
   an expansion switching unit for selectively introducing the coolant supplied into the outdoor-side coolant heat exchanger to either a flow path for the heating expansion unit or another flow path to avoid the heating expansion unit.

2. The air conditioning apparatus for the vehicle of claim 1, further comprising:

another expansion switching unit for selectively introducing the coolant supplied into the indoor-side coolant heat exchanger to either a flow path for the expansion unit or another flow path to avoid the expansion unit.

3. The air conditioning apparatus for the vehicle of claim 1, further comprising a heat-exchanger switching unit for selectively introducing the coolant after heat exchange at the outdoor-side heat exchanger to either a flow path for the indoor-side coolant heat exchanger or another flow path to avoid the indoor-side coolant heat exchanger.

4. The air conditioning apparatus for the vehicle of claim 1, further comprising an internal heat exchanger that performs heat exchange between the coolant discharged from the outdoor-side coolant heat exchanger and the coolant flowing into the compressor.

5. The air conditioning apparatus for the vehicle of claim 1, wherein the power source for driving the vehicle comprises an engine.

* * * * *